(12) United States Patent  (10) Patent No.: US 6,588,537 B2
Rioux et al.  (45) Date of Patent: Jul. 8, 2003

(54) GEAR SHIFT ASSEMBLY FOR STRADDLE-TYPE VEHICLE

(75) Inventors: Roger Rioux, Magog (CA); Claude Gagnon, Magog (CA); Norbert Korenjak, Stadl Paura (AT); Daniel Leclerc, St-Denis-de-Brompton (AT); Ghislain Caron, Valcourt (CA); Mihai Rasidescu, Sherbrooke (CA)

(73) Assignee: Bombardier Inc., Valcourt (CA)

( * ) Notice: Subject to any disclaimer, the term of this patent is extended or adjusted under 35 U.S.C. 154(b) by 0 days.

(21) Appl. No.: 09/891,866

(22) Filed: Jun. 26, 2001

(65) Prior Publication Data

US 2002/0066613 A1 Jun. 6, 2002

Related U.S. Application Data

(60) Provisional application No. 60/227,581, filed on Aug. 25, 2000.

(51) Int. Cl.[7] .................................................. B60K 26/00
(52) U.S. Cl. ...................... 180/333; 180/336; 180/293; 180/908; 192/3.58
(58) Field of Search ................................ 180/908, 230, 180/21, 337, 338, 333, 336, 292, 293; 74/473.1, 473.16, 478, 512; 192/3.5, 3.56, 3.55, 3.57, 3.58

(56) References Cited

U.S. PATENT DOCUMENTS

| | | | | |
|---|---|---|---|---|
| 1,729,173 A | * | 9/1929 | Marfaing | 188/152 |
| 2,430,625 A | | 11/1947 | Waters | |
| 2,552,371 A | | 5/1951 | Erickson | |
| 2,600,767 A | * | 6/1952 | Herrell | 180/230 |
| 2,936,868 A | * | 5/1960 | Myers | 192/3.61 |
| 3,677,379 A | * | 7/1972 | Adams | 192/91 R |
| 3,788,167 A | | 1/1974 | Beaudoin et al. | |
| 3,894,442 A | | 7/1975 | Hembree | |
| 3,919,896 A | | 11/1975 | Foster | |
| 4,085,697 A | | 4/1978 | Gaasenbeek | |
| 4,129,047 A | * | 12/1978 | Dornan | 192/98 |
| 4,344,514 A | * | 8/1982 | Fujihara et al. | 192/3.58 |
| 4,372,416 A | * | 2/1983 | Igarashi | 180/215 |
| 4,497,222 A | | 2/1985 | Nagaoka et al. | |

(List continued on next page.)

Primary Examiner—Lesley D. Morris
Assistant Examiner—Daniel Yeagley

(57) ABSTRACT

A system reduces the amount of work exerted by an ATV operator to change transmission gears. The system includes a foot lever assembly with a mechanical portion, such as a mechanical linkage, attached to an automated portion, such as an electrical switch. When the ATV operator applies a predetermined amount of force to the foot lever assembly, a clutch assembly and a gear box are actuated in a single motion, assisted by the automated portion of the foot lever assembly. Thus, the operator is able to exert less work in order to change the gears.

26 Claims, 12 Drawing Sheets

U.S. PATENT DOCUMENTS

| | | | |
|---|---|---|---|
| 4,516,669 A | * | 5/1985 | Bostrom .................... 192/3.58 |
| 4,518,070 A | | 5/1985 | Ooka |
| 4,566,577 A | | 1/1986 | Tsuboi |
| 4,585,087 A | | 4/1986 | Riccitelli |
| 4,608,879 A | * | 9/1986 | Ishida et al. ............. 74/473.16 |
| 4,650,055 A | | 3/1987 | Ooka |
| 4,754,664 A | | 7/1988 | Dick |
| 4,987,983 A | * | 1/1991 | Adams .................... 192/13 R |
| 5,048,638 A | | 9/1991 | Duncan et al. |
| 5,299,652 A | | 4/1994 | Bevins |
| 5,411,448 A | | 5/1995 | Horii et al. |
| 5,509,496 A | * | 4/1996 | Erickson et al. ............ 180/273 |
| 5,526,889 A | | 6/1996 | Neary |
| 5,661,999 A | | 9/1997 | Carone |
| 5,662,195 A | | 9/1997 | Rush |
| 5,662,349 A | | 9/1997 | Hasshi et al. |
| 5,830,097 A | | 11/1998 | Larkin |
| 5,873,802 A | | 2/1999 | Tabata et al. |
| 5,906,256 A | | 5/1999 | Hayashi et al. |
| 5,906,557 A | | 5/1999 | Kobayashi |
| 5,928,106 A | | 7/1999 | Biros, Jr. et al. |
| 5,954,612 A | | 9/1999 | Baxter, Jr. |
| 5,967,252 A | | 10/1999 | Saban et al. |
| 5,975,266 A | | 11/1999 | Balhorn |
| 6,076,624 A | | 6/2000 | Izumi et al. |
| 6,270,106 B1 | * | 8/2001 | Maki et al. .................... 180/21 |
| 6,394,214 B1 | * | 5/2002 | Hahm ........................ 180/230 |

* cited by examiner

GEAR SHIFT ASSEMBLY FOR STRADDLE-TYPE VEHICLE

This application claims the benefit of provisional application 60/227,581 filed Aug. 25, 2000.

BACKGROUND OF THE INVENTION

1. Field of the Invention

This invention generally relates to the field of transmission assemblies for four-wheel recreational vehicles. More particularly, the present invention relates to a gear shift assembly for shifting the gears of an all-terrain vehicle (ATV) transmission.

2. Description of Related Art

FIGS. 1A and 1B illustrate a straddle-type vehicle 1, such as an all terrain vehicle or ATV, including front wheels 6 and rear wheels 8 suspended on a front end and on a rear end, respectively, of a body frame 4. Handlebars 5 and a seat 11 are mounted on the frame 4. A power unit such as an engine 20 is also mounted on the frame 4 and generates the power required to propel the ATV 1. A transmission 22 is provided to transfer the power generated by the engine 20 to the front wheels 6, the rear wheels 8 or both the front and rear wheels 6, 8 to drive the ATV 1.

Generally, the transmission of an ATV includes a number of different components to efficiently transmit engine power to front and/or rear wheels of the vehicle. In particular, transmission gears are provided for accelerating and decelerating the ATV and include lower gears and higher gears. A clutch is also provided for engaging/disengaging the gears in order to facilitate shifting. The clutch includes a number of different clutch plates that must be opened (separated) for the clutch to properly engage/disengage the gears. Finally, a shifter is provided for permitting an ATV operator to operate the clutch, and thereafter change the gears. One popular type of shifter used in conventional ATV transmissions is a mechanical foot lever assembly, an example of which is illustrated in FIG. 2.

As shown in FIG. 2, a foot shifter 72 is adapted to be operatively connected or linked to the clutch and a gear box (not shown), respectively. Upon actuation of the foot lever, for example, up-shifting or down-shifting, the clutch can be initiated and actuated, i.e., the clutch plates are moved out of engagement with one another. Upon further actuation of the foot lever, the gear box can be initiated and actuated, i.e., a plurality of gears is shifted.

The footshifter must be rotated distance D1 in order to initiate and actuate the clutch, as described above. After the footshifter is rotated distance D1, the operator must rotate the footshifter a further distance D2 to initiate and actuate the gear box while actuating the clutch. The foot shifter 72 must be displaced over a distance D1+D2 in order to carry out a gear changing operation. As illustrated, the distance D1+D2 is a rotational or angular distance, but for the sake of simplicity, the distance D1+D2 could be shown schematically as a linear distance for example.

The amount of work (W) required by the ATV operator to complete the gear shifting of a conventional ATV, having a foot lever assembly as illustrated in FIG. 2, is defined by the following formula: $(W)=(F)*(d)$, where (d) is a displacement distance, typically expressed in meters, which the foot lever must travel in order to operate the clutch and to change gear of the transmission and (F) is an amount of force, typically expressed in Newtons, which is required to move the foot lever through distance (d), which is typically expressed in meters. Thus, in some circumstances, a considerable amount of work (W), which is measured in joules (J), may be required for the ATV operator to use the foot lever 72 to change the gears. This is especially true when the foot lever 72 must travel a large distance to shift the gears. It is also true when a large amount of force (F) must be applied to the foot lever to complete the shift. Tables 1 and 2 illustrate these principles in conventional ATVs.

Table 1 illustrates foot lever displacement distances (d), the amount of required force (F), and the total amount of work (W) required to complete a gear shift in conventional ATVs from four different manufacturers. Gear shift motions include two types. Typically, shifting from a lower gear to a higher gear is called an up-shift and shifting from a higher gear to a lower gear is called a down-shift. Table 1 illustrates up-shifting results and Table 2 illustrates down-shifting results.

TABLE 1

(UP-SHIFT)

| Manufacturer | Distance (Meters) | Force (Newtons) | Work (Joules) |
| --- | --- | --- | --- |
| 1 (350 cc engine) | 0.046 | 115.66 | 5.32 |
| 2 (500 cc engine) | 0.052 | 111.26 | 5.78 |
| 3 (250 cc engine) | 0.053 | 106.83 | 5.66 |
| 4 (250 cc engine) | 0.059 | 97.90 | 5.78 |

TABLE 2

(DOWN-SHIFT)

| Manufacturer | Distance (Meters) | Force (Newtons) | Work (Joules) |
| --- | --- | --- | --- |
| 1 (350 cc engine) | 0.046 | 120.14 | 5.53 |
| 2 (500 cc engine) | 0.045 | 124.59 | 5.61 |
| 3 (250 cc engine) | 0.070 | 88.99 | 6.23 |
| 4 (250 cc engine) | 0.057 | 88.99 | 5.07 |

FIG. 3 illustrates a computer controlled shifting mechanism, generally indicated at 71, in related art that requires little effort from the ATV operator to shift gears. The shifting mechanism is mounted onto a handlebar of a conventional ATV. The problem, however, with computer controlled shifters, especially handlebar-mounted configurations, is that they sometimes do not provide the operation with a feeling of complete control over the shifting operation, which some operators believe results in an unnatural feel. That is, most ATV operators consider the mechanical foot lever more enjoyable and sportier than the purely electronic shifters.

A need has developed for a gear shift assembly that combines the benefits of a mechanical foot shifter with a modicum of computer control so that a vehicle operator, such as an ATV operator, need not exert a large amount of work to shift the vehicle's gears.

SUMMARY OF THE INVENTION

Consistent with the principles of the present invention as embodied and broadly described herein, one embodiment includes a vehicle comprising an engine, a gear box operatively coupled to the engine and a clutch assembly operatively coupled to the gear box. A foot shifter assembly is operatively coupled to at least one of the clutch assembly and the gear box and is displaceable over a predetermined distance (d). The predetermined distance (d) permits the shifting of the gears using a predetermined amount of work (W), the predetermined amount of work being defined by the following expression: W=(F)*(d). W is one of a group consisting of less than about 5.3 joules for an up-shift and less than about 5.0 joules for a down-shift.

In another embodiment, a vehicle comprises a plurality of wheels, an engine operatively coupled to at least one of the plurality of wheels to impart a driving rotation thereto and a clutch assembly operatively connected to the engine. A gear box is configured to shift gears and being operatively connected to the clutch assembly. A foot shifter assembly is operatively connected to the clutch assembly and the gear box and is displaceable over a predetermined distance to actuate both the clutch and the gear box. Displacement of the foot shifter assembly through the predetermined distance actuates the clutch and the gear box to shift gears.

Yet another embodiment includes a gear shift assembly for a straddle-type vehicle including a power unit having a transmission assembly having a plurality of gears for transmitting power to at least one wheel. The gear shift assembly comprises a foot shifter assembly operatively connected to the transmission assembly and selectively displaceable over a predetermined distance, for example, by a vehicle operator. A shift rod has a first end attached to the foot shifter assembly and a second end configured to transfer motion when the foot shifter assembly is displaced over the predetermined distance. A shift lever is linked to the second end of the shift rod and has a notch formed therein. A clutch has a plurality of clutch plates configured to engage and disengage the gears. An electrical switch is associated with the clutch and configured to open the clutch plates. The electrical switch has a trigger operatively associated with the notch. Movement of the shift lever actuates the electrical switch to open and close the clutch plates.

Another embodiment includes an apparatus comprising a straddle-type vehicle including a body frame supported by front and rear wheels. A seat is supported above the frame and a power unit is supported by the frame below the seat. The power unit has a transmission including gears. A foot shifter is operatively attached to the power unit and is selectively displaced over a predetermined distance (d) upon application of a predetermined amount of force (F) by a vehicle operator. The selective movement of the foot shifter assembly thereby shifts the gears. The selective displacement includes an up-shift and a down-shift. The predetermined distance (d) permits the shifting of the gears using a predetermined amount of work (W) and the predetermined amount of work is defined by the following expression: W=(F)*(d). W is one of a group consisting of less than about 5.3 joules for an up-shift and less than about 5.0 joules for a down-shift.

In one preferred embodiment, W is less than about 5.3 joules for an up-shift and less than about 5.0 joules for a down-shift.

Other objects of the present invention will be revealed by the discussion that follows.

BRIEF DESCRIPTION OF THE DRAWINGS

The accompanying drawings, which are incorporated in and constitute a part of this specification, illustrate preferred embodiments of the invention and, together with the description, explain the objects, advantages, and principles of the invention. In the drawings.

DETAILED DESCRIPTION OF PREFERRED EMBODIMENTS

The following detailed description refers to the accompanying drawings that illustrate exemplary embodiments consistent with the present invention. Other embodiments are possible and modifications may be made to the embodiments without departing from the spirit and scope of this invention. Therefore, the following detailed description is not meant to limit the invention solely to the embodiments described.

Figure 4:
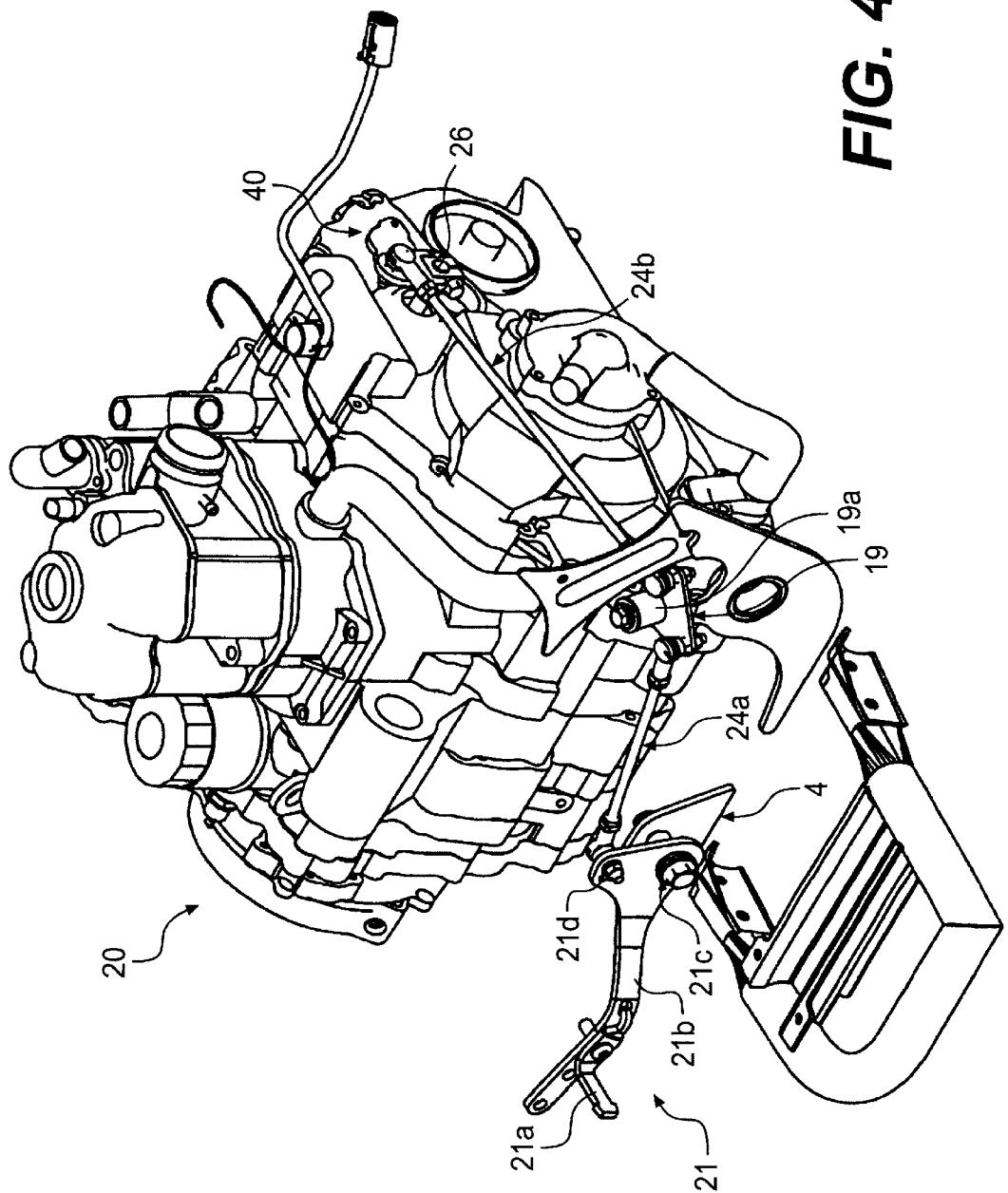
FIG. 4 is a perspective view of an engine of the ATV shown in FIG. 1A.
Figure 5:
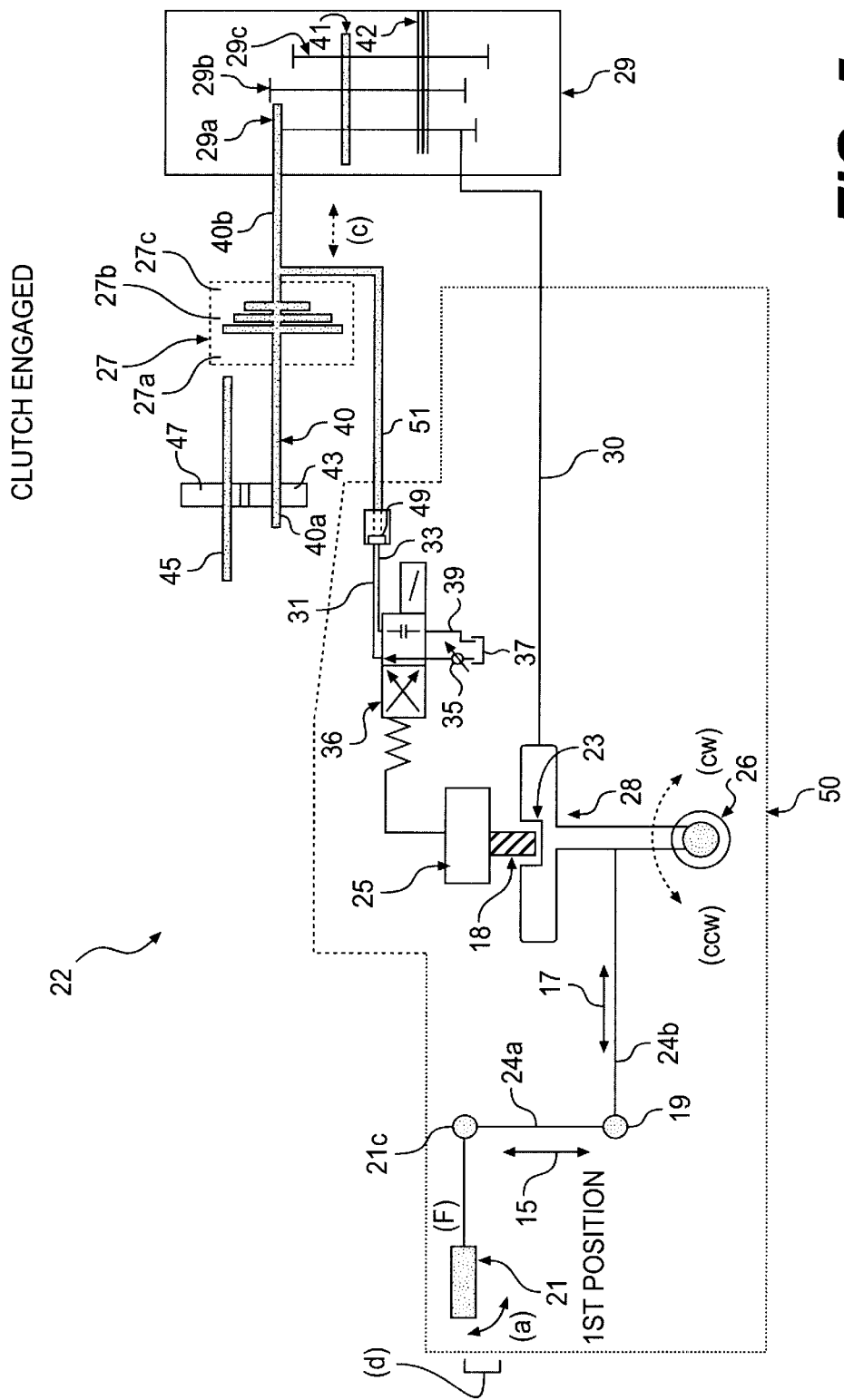
FIG. 5 is a functional block diagram depicting a gear shift assembly of the present invention showing a shift lever in a first position.
Figure 6:
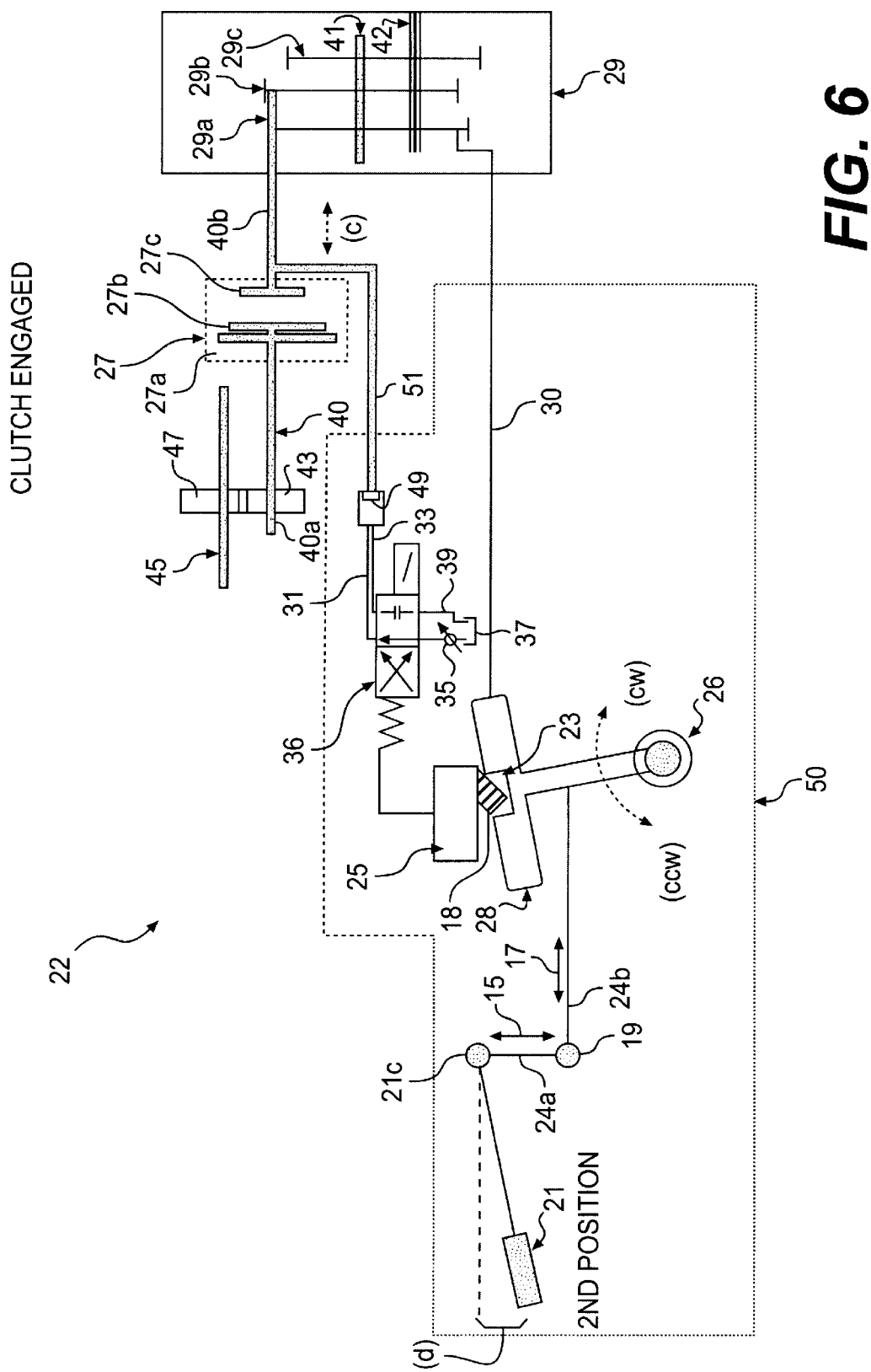
FIG. 6 is a functional block diagram depicting the gear shift assembly of FIG. 5 showing the shift lever in a second position.

FIG. 4 illustrates a perspective view of an engine 20 equipped with a gear shift assembly, generally indicated at 50 in FIGS. 5 and 6, of the present invention. The gear shift assembly 50 can be operatively coupled to any ATV or other straddle-type vehicles to shift gears thereof.

As illustrated, the gear shift assembly 50 can include a foot lever assembly, generally indicated at 21, to permit operation of the transmission 22 by the ATV operator. The foot lever assembly 21 can be attached to the frame 4. In particular, the foot lever assembly 21 includes a toe piece 21a and a lever member 21b. The lever member 21b is connected to the frame 4 at pivot 21c with a low friction bushing or bearing (not shown) and includes at least one aperture 21d. A first shift rod 24a has one end connected to the aperture 21d and a second end connected to a pivot plate 19. Similarly to the lever member 21b), the pivot plate 19 is also mounted to the frame 4 at pivot 19a with a low friction bushing or bearing (not shown). A second shift rod 24b has one end connected to the pivot plate 19 and another end connected to an extension arm 40 that is connected to a shaft 26 that is operatively coupled with a gear box 29 (FIGS. 5 and 6). Up-shifting or down-shifting of the foot lever assembly 21 along double-arrowed arcuate line (a) causes reciprocal movement of the first and second shift rods 24a, 24b, as represented by double-arrowed lines 15, 17 shown in FIG. 5, respectively, to thereby rotate shaft 26 for changing gears, as more fully described below in connection with FIGS. 5 and 6.

Figure 1A:
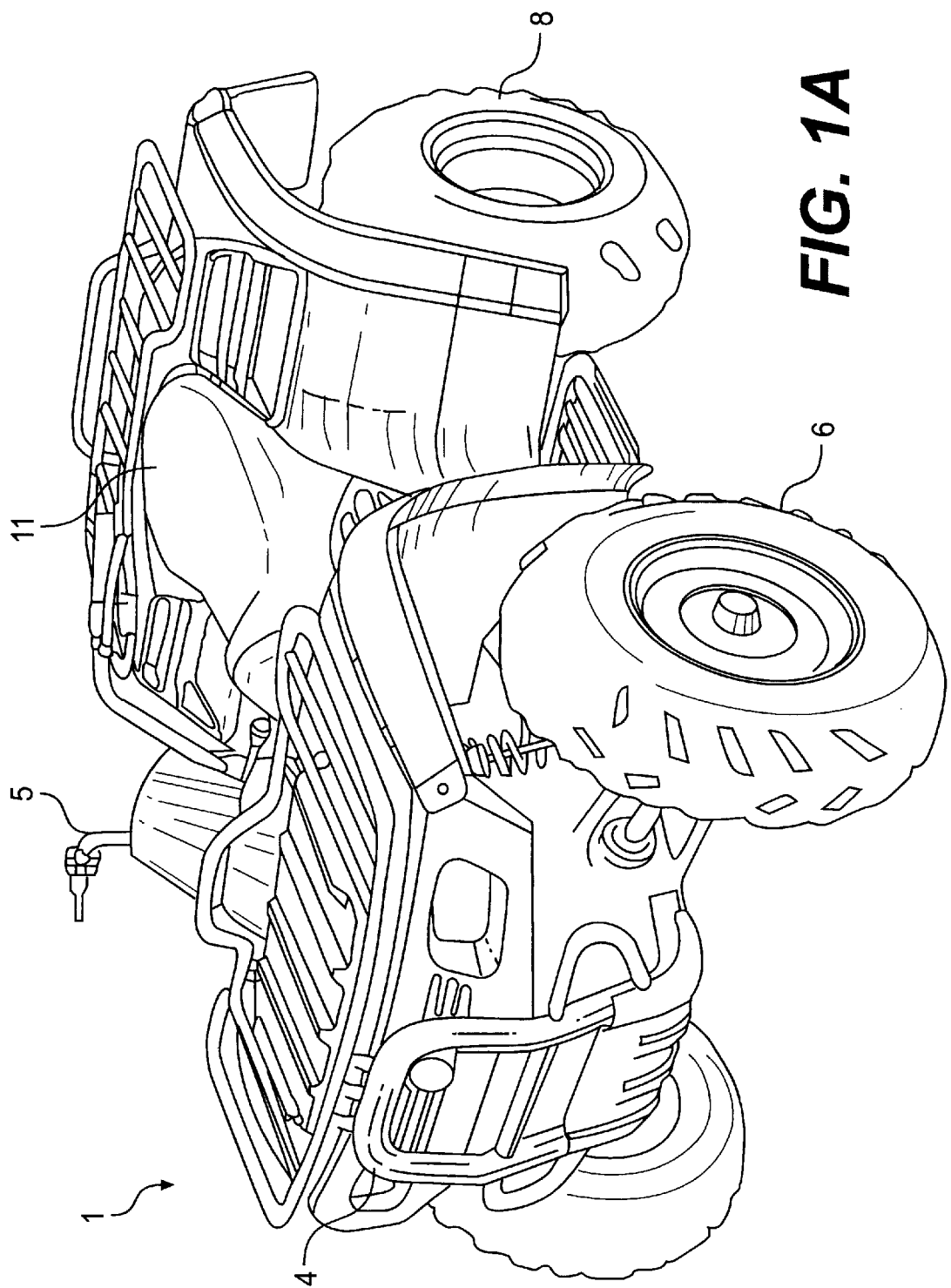
FIG. 1A illustrates a perspective view of an ATV.
Figure 1B:
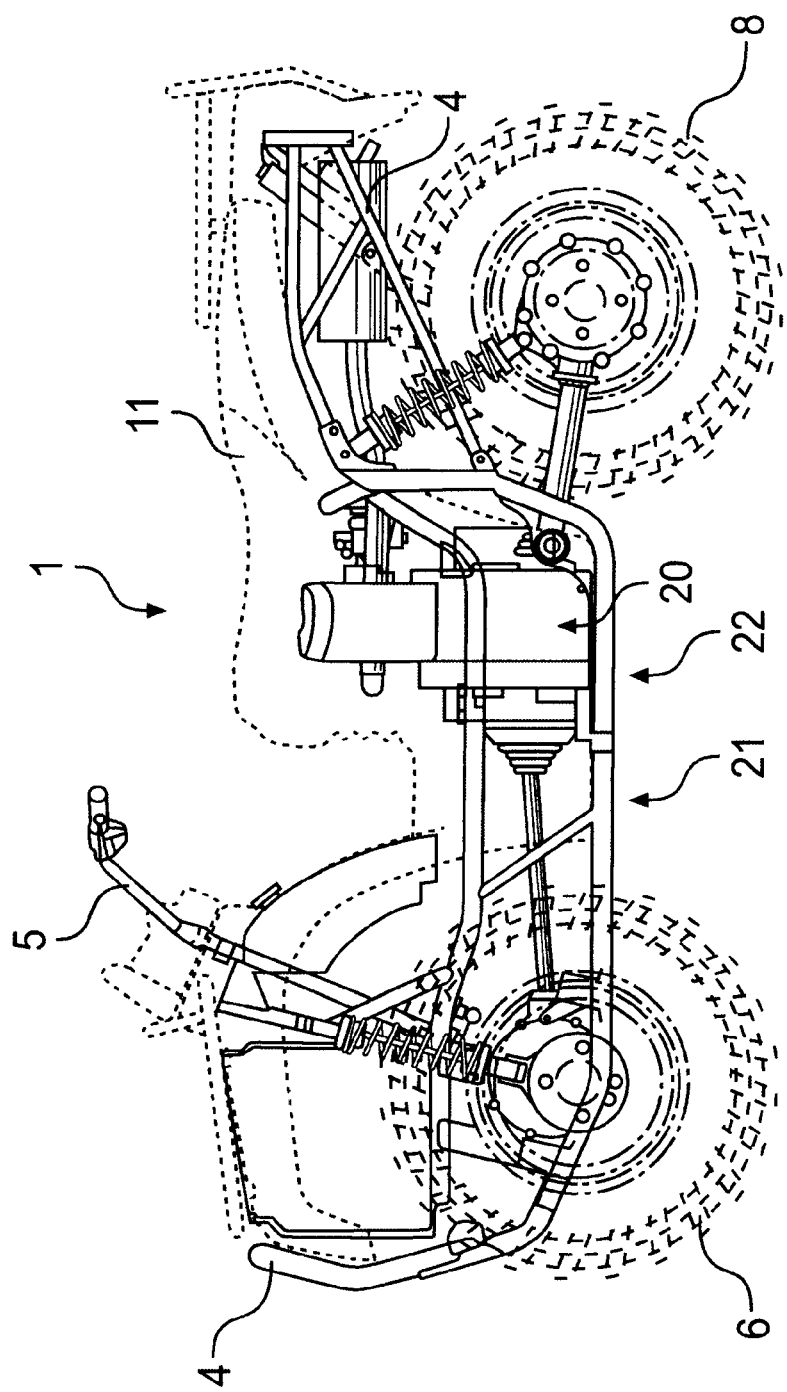
FIG. 1B illustrates a side view of the ATV shown in FIG. 1A.

Referring now to FIG. 5, the transmission 22 of ATV 1 (FIG. 1B) includes the gear shift assembly 50 and a transmission gearbox 29 that includes a plurality of gears 29a–29c used for changing an operational speed of the ATV 1, i.e., accelerating/decelerating. In this illustrated example, the gear 29a is used primarily for operation at lower speeds, the gear 29b is used primarily for operation at medium speeds, and the gear 29c is used primarily for operation at higher speeds. Although three gears are described, more or less gears may be provided.

FIG. 5 also shows a crank-shaft 45 having a gear 47 disposed thereon. The crank-shaft 45 is positioned generally parallel to and in spaced relation with a main shaft 40. The main shaft 40 includes a first main shaft portion 40a and a second main shaft portion 40b, each disposed on opposite sides of a clutch assembly 27. The first main shaft portion 40a has a gear 43 disposed thereon. The gear 43 of the first main shaft portion 40a engages the gear 47 of the crank-shaft 45 so that the first main shaft portion 40a rotates with the crank-shaft 45, for example, in accordance with an engine speed selected by the operator during operation of the engine 20. The crank-shaft 45 is connected to a first side of the clutch assembly 27 through the gear connection formed by the cooperation of the gear 47 and gear 43 of the first main shaft portion 40a.

The clutch assembly 27 is rotatably coupled to the first main shaft portion 40a to transmit rotational motion to remaining portions of the transmission 22. For example, rotary motion of the crank-shaft 45 is transmitted to the main shaft 40, which is, in turn, connected to the gearbox 29. The clutch assembly 27 engages and disengages the rotational motion of crank-shaft 45 together with the main shaft 40 in order to permit an operator of the ATV 1 to smoothly shift the gears 29a–29c. Specifically, the clutch 27 transfers the rotational motion of the crank-shaft 45 through the main shaft 40 to the gearbox 29. As is conventionally known, a secondary shaft 41 and an output shaft 42 interconnect the second main shaft portion 40b and gears 29a–29c to facilitate the distribution of the rotational motion to the front wheels 6, rear wheels 8 or front and rear wheels 6, 8.

The clutch assembly 27 includes a clutch flywheel 27a and a clutch plate 27b connected together as one unit. This unit is configured for selective coupling with a pressure plate 27c connected to the second main shaft portion 40b. The clutch flywheel 27a is connected to, and driven by, the cooperation of the crank-shaft 45 and the first main shaft portion 40a. While rotating in accordance with the rotational motion of the crank-shaft 45 and first main shaft portion 40a, the clutch plate 27b is configured to frictionally connect with the pressure plate 27c for the ATV 1 to move. That is, the clutch plate 27b transmits its rotational motion to the pressure plate 27c through frictional contact. When the clutch plate 27b and the pressure plate 27c are frictionally coupled, the clutch assembly 27 is considered to be in an engaged state, as best seen in FIG. 5.

Although one configuration of the clutch assembly 27 is described above, the clutch assembly 27 can be a multi-disk clutch, a hydraulic clutch, an electromagnetic clutch or any other known clutch assembly, for example. Various modifications may be needed to implement each of these different clutch assemblies. For example, an electromagnetic clutch could need a magnet or some other magnetic force generator to provide a magnetic force to engage or disengage the clutch plate 27b and the pressure plate 27c.

When the clutch assembly 27 is engaged, a particular one of gears 29a–29c is in operation. The gears 29a–29c cannot be shifted when the clutch assembly 27 is in the engaged state, as shown in FIG. 5. FIG. 6 shows that when the clutch plate 27b and the pressure plate 27c are not connected, the clutch assembly 27 is in a disengaged state. While in the disengaged state, the operator is able to smoothly shift the gears 29a–29c. The operator of the ATV 1 controls the engaging/disengaging of clutch assembly 27 and shifts gears 29a–29c, by pressing the foot lever assembly 21.

Figure 2:
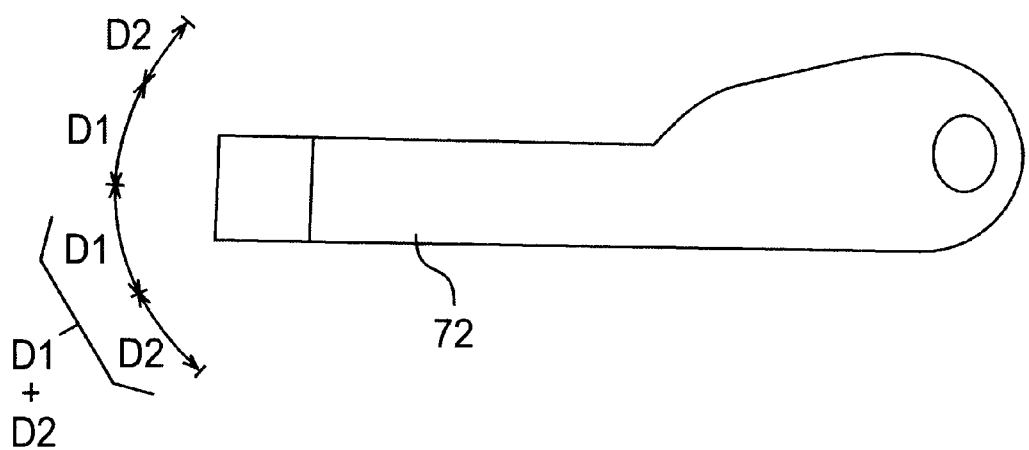
FIG. 2 is an illustration of a related art mechanical gear shift and a clutch assembly.

The foot lever assembly 21 of the gear shift assembly 50 is located at a proximal end of the first shift rod 24a with respect to the operator of ATV 1. The first shift rod 24a is connected to the second shift rod 24b through pivot plate 19, as described above in relation to FIG. 2. The second shift rod 24b is linked to a hammer or shift lever 28. The shift lever 28 is pivotably attached to the shaft 26. During operation, the second shift rod 24b reciprocates to thereby rotate the shift lever 28 about the shaft 26 in clockwise (cw) and counterclockwise (ccw) directions (FIGS. 5–6). Clockwise rotation of the shift lever 28 causes up-shifting to a higher gear, while counterclockwise rotation causes down-shifting to a lower gear. As illustrated in FIGS. 5 and 6, the shift lever 28 is a generally T-shaped member, but the shift lever 28 can have any configuration that is operatively connected to the second shift rod 24b and pivotably attaches to the shaft 26 to effect rotation thereof.

The gear shift assembly 50 is shown in FIG. 6 with the foot lever assembly 21 being moved the predetermined displacement distance (d) into a second position thereof.

Figure 3:
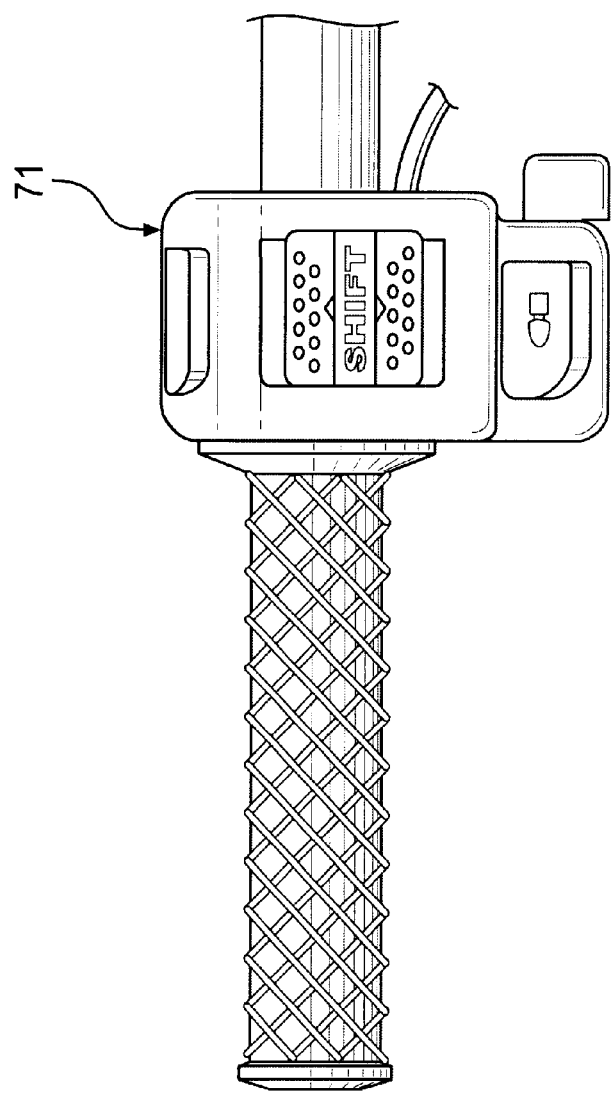
FIG. 3 is an illustration of a related art computer controlled gear shift assembly.

Conventional ATV shift assemblies typically comprise mechanical links or electrical links, such as, for example, computer controlled links, as mentioned above and shown in FIG. 3. The gear shift assembly 50 of the present invention, however, provides a hybrid mechanism, that combines the benefits of both mechanical and automated portions, such as mechanical linkages and electrical links. Included in these benefits is the provision of a reduced amount of work (W), e.g., smaller displacement distance (d) and/or a smaller force (F), to complete a shift of gears 29a–29c from one gear to another. The foot lever assembly 21, the shift rods 24a, 24b, the shift lever 28 and a shift fork 30 (FIG. 5) form a mechanical portion of the gear shift assembly 50. An automated actuating mechanism, such as electrical switch 25, hydraulic valve 36 and piston 49, for example, forms an automated portion of the gear shift assembly 50. The hydraulic valve 36 can be invoked, for example, by activation of the electrical switch 25, to engage and disengage the clutch plate 27b with the pressure plate 27c of the clutch assembly 27, when the operator desires to shift the gears 29a–29c.

In this example, actuation of the clutch assembly 27 is the automated portion of the gear shift assembly 50. The use of an automated portion of the gear shift assembly 50 reduces the work required to shift the gears 29a–29c and produces a more natural feel (or resistance) for the ATV operator during shifting of the gears 29a–29c. Other portions of the gear shift assembly 50 could be automated as well.

A trigger 18 is configured to activate the switch 25 and is operatively associated with a notch 23 of the shift lever 28 (FIGS. 5 and 6). Alternatively, the switch 25 could include a notch and the shift lever 28 could include a trigger or the trigger 18 could be replaced with a ball, as is generally known in the art.

In this particular embodiment, the hydraulic valve 36 is operatively connected to and electrically deployable by the electrical switch 25 and is connected to the second main shaft portion 40b. A hydraulic pump 35 is operatively coupled to the hydraulic valve and is configured to pump oil or some other hydraulic fluid from a reservoir 37 through a hydraulic line 31 to actuate the piston 49. The hydraulic valve 36 also includes hydraulic lines 33, 39 that are configured to drain the oil or other hydraulic fluid to the reservoir 37 when the piston is not actuated. In an alternative embodiment, lines 31, 33 could be formed as one hydraulic line.

A shaft 51 (FIG. 5) is configured to be automatically deployed in a direction along an axis (c) when the trigger 18 is actuated, for example, by receiving an electrical signal from the switch 25. When the shaft 51 deploys (FIG. 6), the hydraulic pump 35 pumps oil or some other hydraulic fluid from the reservoir 37 through the hydraulic line 31 to actuate the piston 49 from an initial position thereof, which in turn separates the pressure plate 27c from the clutch plate 27b.

When the piston 49 moves back to its initial position (FIG. 5), i.e., when the trigger 18 is not actuated, the pressure plate 27c moves in the same direction along axis (c), thus moving the pressure plate 27c to frictionally engage the clutch plate 27b. Oil or other hydraulic fluid can be drained from the piston 49 through the hydraulic lines 33, 39 to the reservoir 37.

Next, operation of the gear shift assembly 50 and the clutch assembly 27 will be described in detail. In this embodiment, the clutch assembly 27 is actuated, but the gear box 29 or the gears 29a–29c could be automated instead of, or in addition to, the automation of the clutch assembly 27, for example.

The gear shift assembly 50 of the ATV 1 enables the operator to more easily shift the gears 29a–29c, i.e., requiring less work, in comparison to the shifting of conventional ATVs. As mentioned above, when the operator of the ATV 1 desires to shift the gears 29a–29c, the user must operate the clutch assembly 27 to disengage a particular gear of the gears 29a–29c that is in use. On conventional ATVs, a first portion of this motion activates the clutch, and a second portion of the motion shifts the gear. The present invention, however, reduces the amount of work required by the operator by using a single motion to operate the clutch and shift the gears.

When the ATV 1 is being driven in one of the gears 29a–29c, the clutch assembly 27 is in the engaged state, as illustrated in FIG. 5. When the operator desires to shift gears 29a–29c, the operator must move the foot lever assembly 21 by using his or her foot. When the operator of the ATV 1 desires to shift the gears 29a–29c, the operator activates the gear shift assembly 50. In particular, the operator applies a force (F) to the toe piece 21a of the foot lever assembly 21 to move the foot lever assembly 21 in a preferred direction along the double-arrowed line (a), by a predetermined displacement distance (d). To start the shift, the foot lever assembly 21 is preferably moved entirely through the displacement distance (d). When the operator applies the force (F) along the line (a), the shift lever 28 rotates in the (cw) or (ccw) direction, as illustrated in FIGS. 5–6. The rotation causes the notch 23 to operatively connect with the trigger 18. For example, if the shift lever 28 rotates in the (ccw) direction, the notch 23 will cause the trigger 18 to move in the direction indicated in FIG. 6. If the shift lever 28 moves in the (cw) direction, the notch 23 will cause the trigger 18 to move in a direction that is opposite to the direction illustrated in FIG. 6. To complete the shift, the shift lever 28 moves back to the initial position by conventional means known in the art. At that point, the trigger no longer engages the notch 23, and the clutch plate 27b re-couples with the pressure plate 27c.

Movement of the trigger 18 activates the electrical switch 25 to automatically deploy the shaft 51 in the direction along the axis (c). The switch 25 or other actuating mechanism could be operatively connected to the shift fork 30 to shift the gears 29a–29c upon movement of the shift lever 28. When deployed by the electrical switch 25, the shaft 51, connected to the second main shaft portion 40b and to the pressure plate 27c, separates the pressure plate 27c from the clutch plate 27b, thereby placing the clutch assembly 27c in the disengaged state, as shown in FIG. 6. At the same time or immediately thereafter, the clutch assembly 27 becomes disengaged, the gear shift assembly 50, which is connected to the gearbox 29, is able to smoothly shift the gears 29a-29c. If the operator applies force (F) to foot lever assembly 21 to shift gears 29a–29c, a single motion of shift lever 28 activates electrical switch 25 which automatically disengages clutch assembly, and shifts gears 29a–29c. Thus, a single motion of the operator's foot provides the work required to complete an entire shift of gears 29a–29c.

Although the embodiments of the present invention illustrated in FIGS. 4–6 show the automation of only the clutch assembly 27, other embodiments may automate the gear box 29 or the gears 29a–29c instead of, or in addition to, the automation of the clutch assembly 27. For example, either the automated actuating mechanism described above or other actuating mechanisms could be operatively connected to the gear shift assembly 50 to shift the gears 29a–29c upon movement of the shift lever 28. In the event that one or more automated actuating mechanisms are used to activate the gear box 29 and the clutch assembly 27, the foot lever assembly 21 could be designed, structured, and configured such that the motion simulates the feeling of shifters that do not use automated actuating mechanisms. For example, one designing a foot shifter would want to avoid an overly sensitive foot shifter that only requires a negligible amount of movement or force to cause actuation of the gear box and clutch. A spring could be coupled to the foot lever assembly 21 to provide a certain resistance thereto in order to reduce the sensitivity of the foot lever assembly 21.

In yet another embodiment, the automated actuating mechanism described above could be used to shift the gears 29a–29c instead of being used to move the pressure plate 27c. Here, movement of the foot shifter 21 would provide the work needed to move the pressure plate 27c.

As mentioned above, two factors are used to calculate the work (W) required to complete a shift of the gears 29a–29c: (1) the force (F) required to move shift lever 28, and (2) the displacement distance (d) that the foot lever assembly 21 must travel to complete the shift. (W), (F), and (d) are related to one another in the following manner: $(W)=(F)*(d)$, where (W) is the total amount of work measured in joules, (F) is the force measured in newtons, and (d) is the displacement measured in meters. It has been discovered through experimentation that on average, the force (F) required to shift the gears 29a–29c of the present invention is about 89–107 newtons. Experimentation has also shown that on average, the displacement distance (d) is about 0.043 meters for up-shifting and about 0.030 meters for down-shifting. The force (F) required to shift the gears in a conventional ATV is a little higher than that required in ATV 1 of the present invention. The displacement distance (d) for up-shifting of conventional ATVs, however, is much larger.

Experimentation has shown, for similar size engines, that the amount of work (W) required in order for the operator of ATV 1 to complete a shift of the gears 29a-29c, is significantly less than a comparable amount of work in conventional ATVs. Tables 3 and 4 illustrate measurements of the force (F), the displacement distance (d), and the total work (W) required to shift the gears 29a–29c of the ATV 1 of the preferred embodiment compared to the ATVs listed in Tables 1 and 2 above.

TABLE 3

(UP-SHIFTING)

| | Distance (Meters) | Force (Newtons) | Work (Joules) | Percent increase of work (W) over preferred embodiment |
|---|---|---|---|---|
| Preferred Embodiment (500 cc engine) | 0.043 | 88.99 | 3.83 | — |
| Yamaha Big Bear ™ (350 cc engine) | 0.046 | 115.66 | 5.32 | 39 |
| Suzuki QuadRunner ™ (500 cc engine) | 0.052 | 111.26 | 5.78 | 51 |
| Yamaha Bear Tracker ™ (250 cc engine) | 0.053 | 106.83 | 5.66 | 48 |
| Honda FourTrax ™ (250 cc engine) | 0.059 | 97.90 | 5.78 | 51 |

TABLE 4

(DOWN-SHIFTING)

| | Distance (Meters) | Force (Newtons) | Work (Joules) | Percent increase of work (W) over preferred embodiment |
|---|---|---|---|---|
| Preferred Embodiment (500 cc engine) | 0.030 | 106.79 | 3.20 | — |
| Yamaha Big Bear ™ (350 cc engine) | 0.046 | 120.14 | 5.53 | 73 |
| Suzuki QuadRunner ™ (500 cc engine) | 0.045 | 124.50 | 5.61 | 75 |
| Yamaha Bear Tracker ™ (250 cc engine) | 0.070 | 88.99 | 6.23 | 94 |
| Honda FourTrax ™ (250 cc engine) | 0.057 | 88.99 | 5.07 | 58 |

Table 3 compares the amount of work (W) required to complete an up-shift of the gears 29a–29c of ATV 1 to conventional ATVs and Table 4 represents the same comparison for down-shifting. It will be appreciated, from the comparisons of Tables 3 and 4 with Tables 1 and 2, that the amount of work (W) required to complete a shift of gears 29a–29c of the ATV 1 is significantly less than the amount of work (W) required to shift the gears of conventional ATVs. The work (W) required for up-shifting and down-shifting the gears of a 500 cc engine using the foot shifter 21 of the ATV 1 was even less than the work required for up-shifting and down-shifting the gears of the 250 cc and 350 cc engines that use conventional foot shifters. For example, the 250 cc engines could be manufactured by Honda and sold under the trademark FourTrax™ or could be manufactured by Yamaha and sold under the trademark Bear Tracker™. The 350 cc engine could be, for example, manufactured by Yamaha and sold under the trademark Big Bear™. The 500 cc engine illustrated in Tables 3 and 4 could be manufactured by Suzuki and sold under the trademark Quadrunner™.

Figure 7:
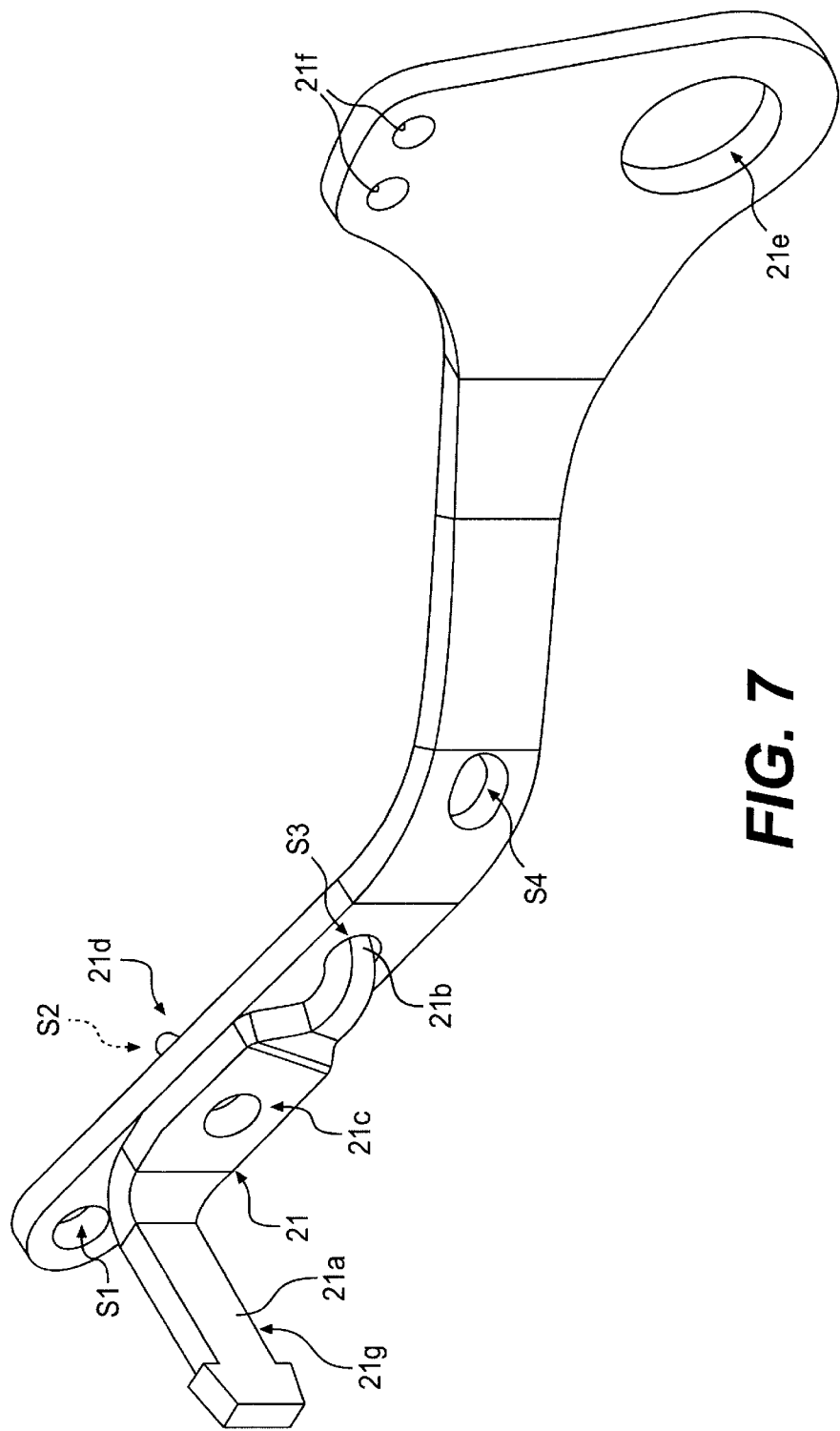
FIG. 7 is a perspective view illustrating an adjustable foot lever assembly of the ATV shown in FIG. 1A with an adjustable foot member coupled thereto.

FIG. 7 illustrates a schematic view of a foot shifter 21 used in a preferred embodiment of the ATV 1. As indicated, the foot lever assembly 21 includes an adjustable foot member 21g. The foot member 21g includes a first end having an extension 21a and a second end having an anchor 21b. The foot member 21g also includes a central portion 21c having a post 21d. The post 21d of each foot member 21g is intended to fit into one of slots S1–S3 formed on the main body of the foot lever assembly 21, while the anchor 21b engages one of the slots S1–S4. Thus, the extension 21a which is provided with a rubber or plastic cap (not shown), is capable of assuming one of three positions P1–P3 (FIGS. 6–7) along the foot lever assembly 21. In FIG. 7, the extension 21a is shown in position P2. Although three positions are shown, more or less than three positions are also contemplated within the scope of this invention and can be used as well. For example, the slots S1–S4 may be replaced with a single longitudinal slot which could provide for a plurality of different positions. Connection apertures 21f are provided for attaching the foot lever assembly 21 to the first shift rod 24a.

Figure 8:
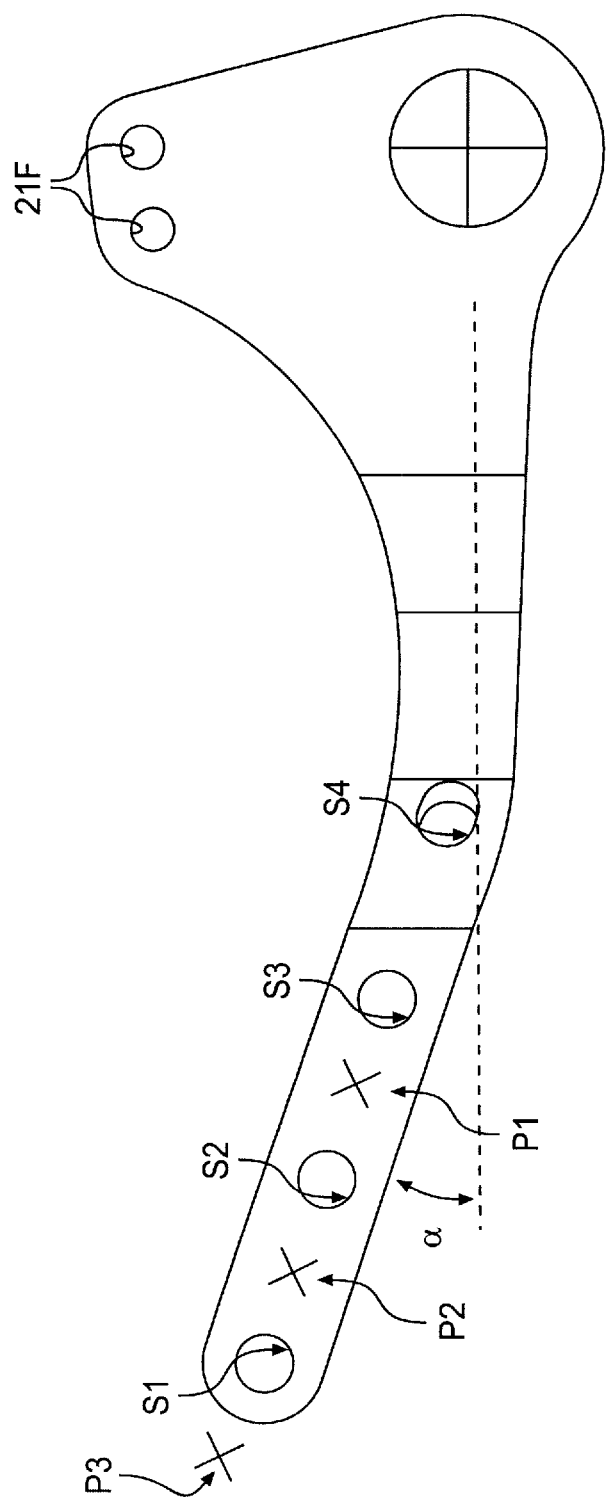
FIG. 8 is a side view illustrating the foot lever assembly of FIG. 7 with foot member attachment slots.
Figure 11:
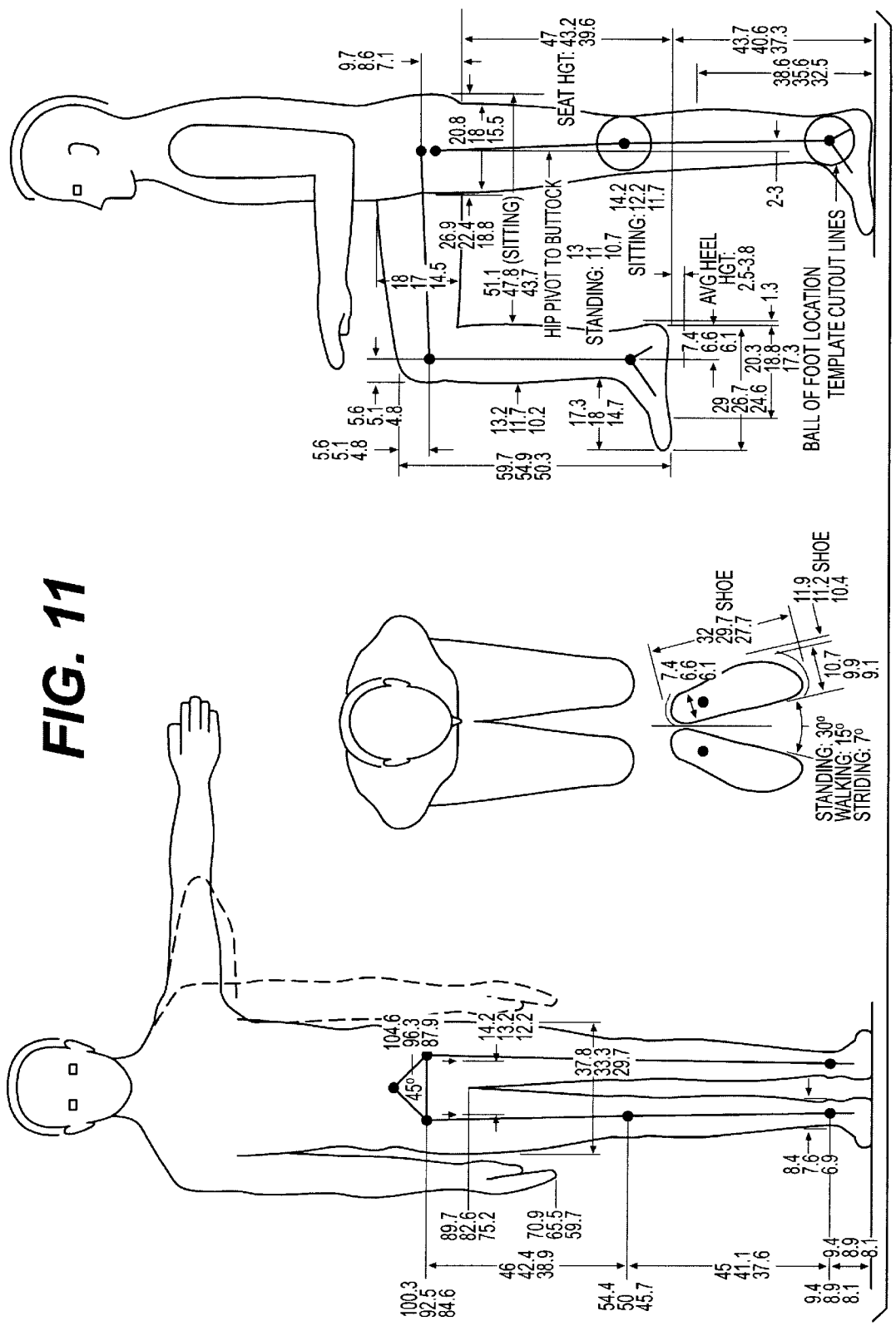
FIG. 11 is a drawing defining various dimensions of a standard human being.

FIG. 8 shows that the foot lever assembly 21 provides an ergonomic arrangement able to accommodate riders having different foot sizes or who wear different types of footwear, such as winter boots or tennis shoes. Specifically, attachment slots S1–S4 provide a variety of placement locations for the foot member 21g based upon the size of the rider's foot, shoe, and/or riding preferences. Average sizes of the rider's foot may be derived from the Humanscale by H. Dreyfuss, appended herein as FIG. 11, which describes the dimensions of an average person. FIG. 8 also shows that the positions P1–P3 of the extension 21a do not necessarily correspond to the locations of the slots S1–S4. Further, an elongated design feature of the foot lever assembly 21, as shown in FIGS. 8 and 9, provides greater shifting leverage for the ATV 1 operator, which also contributes to the reduction of work (W) required to shift the gears 29a–29c.

The foot lever assembly 21 is also curved upwardly along an angle α to accommodate differently sized feet. In an exemplary embodiment of the present invention, α may be in a range from about 15 to 40 degrees. Stated another way, as the length of the foot becomes greater, the thickness of the foot also becomes greater. Also, for smaller riders who ride near the front of the seat, the tip of the foot tends to point further towards the ground, which can make it difficult to reach the extension 21a of the foot shifter. Thus, the angle α or shape of the foot lever assembly 21 is selected to accommodate riders with large, average, and small feet and those who wear different types of shoes/boots while riding.

Figure 9:
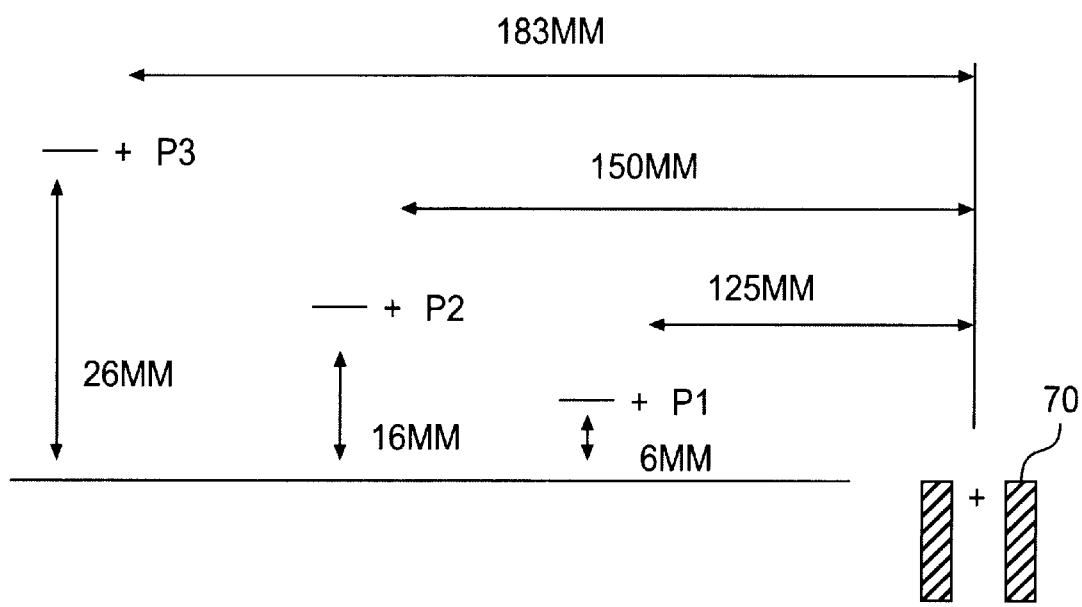
FIG. 9 is a schematic view showing distances from a resting member to each of a plurality of foot member positions.

FIG. 9 illustrates optimal locations for the positions P1–P3 of the extension 21a shown in FIG. 8. In particular, position P1 will accommodate small riders having a comparatively smaller foot and shoe, generally smaller than 97.5 percent of all adult feet. Position P2 accommodates a person having an average size foot. Finally, position P3 will accommodate a person having a larger foot while wearing a winter boot, generally larger than 97.5 percent of all adult feet.

Also, as shown in FIG. 9, resting member 70 is provided on which the rider may place the heel of his/her foot while riding the ATV 1. Distances indicated in FIG. 9 correspond to position P1–P3 with respect to a position of the resting member 70. Thus, each rider of the ATV 1 is able to attach the foot member 21g to the foot lever assembly 21 in the manner shown in FIG. 7, based upon the size of the rider's foot, the size of the rider's boot or the rider's personal preference. The positions P1–P3 shown in FIG. 9 have been derived from the Humanscale by H. Dreyfuss, appended herein as FIG. 11, which describes the dimensions of an average person. Alternatively, the positions P1–P3, however, may be changed to any values to accommodate operators of all sizes.

Figure 10:
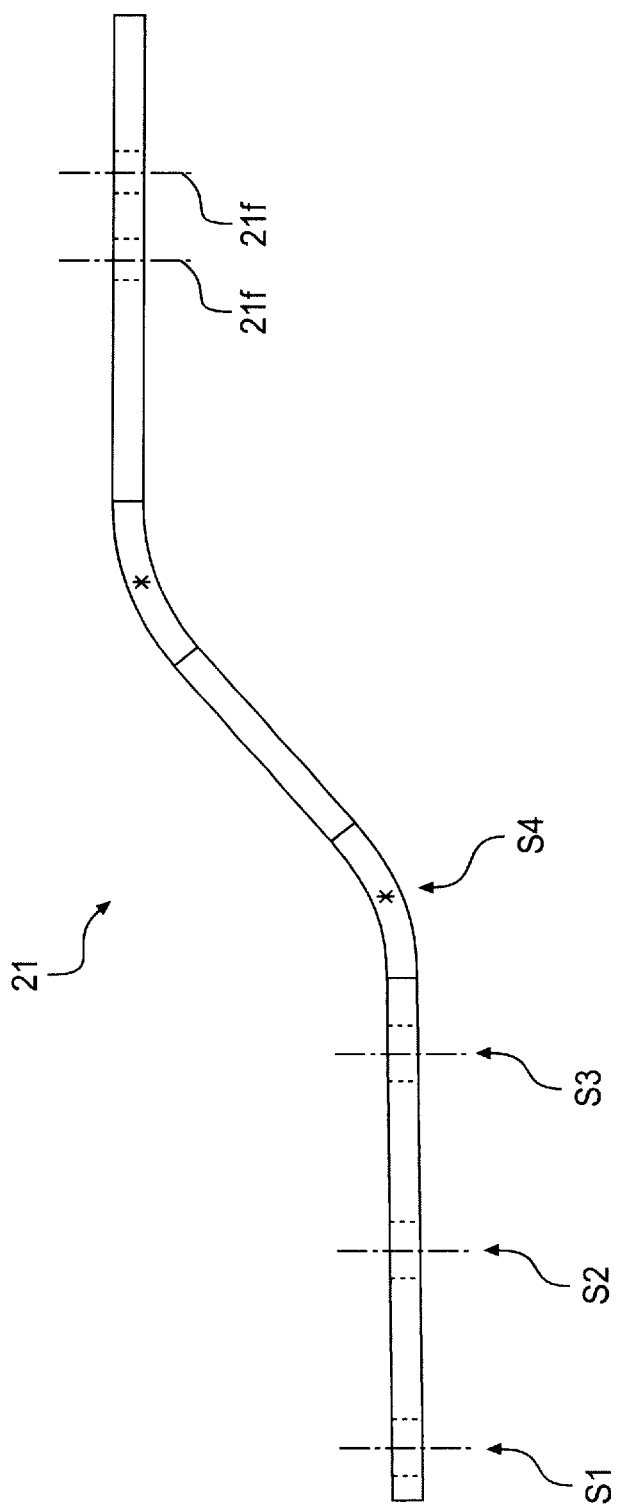
FIG. 10 is a top view of the foot lever assembly of FIG. 8.

FIG. 10 illustrates a top view of the foot lever assembly 21, indicating an outwardly curved design providing for placement of the rider's foot at a predetermined distance away from the engine 20 of the ATV 1.

While the description of the present invention had been directed to use on ATVs, it should be noted that the present invention may be applied to any vehicle that requires a foot actuated gear shifting. For example, the present invention could be applied equally to motorcycles, go-carts, and other motorized vehicles.

The foregoing description of the preferred embodiments provides an illustration and description, but is not intended to be exhaustive or to limit the invention to the precise form disclosed. Modifications and variations are possible consistent with the above teachings or may be acquired from practice of the invention.

What is claimed is:

1. A vehicle comprising:
    an engine;
    a gear box operatively coupled to the engine;
    a clutch assembly operatively coupled to the gear box; and
    a foot shifter assembly operatively coupled to at least one of the clutch assembly and the gear box and displaceable over a predetermined distance (d),
    wherein displacing the foot shifter assembly over the predetermined distance (d) permits the shifting of gears of the gear box using a predetermined amount of work (W), the predetermined amount of work being defined by the following expression: $W=(F)*(d)$, and
    wherein at least one of the following conditions exist: 1) W is less than about 5.3 joules for an up-shift and 2) W is less than about 5.0 joules for a down-shift.

2. A vehicle according to claim 1, wherein actuation of the clutch assembly and the gear box is substantially in series.

3. A vehicle according to claim 1, further comprising an automated actuation mechanism configured to automatically actuate at least one of the clutch assembly and the gear box when the foot shifter assembly is displaced over the predetermined distance (d).

4. A vehicle according to claim 3, wherein the automated actuation mechanism comprises at least one switch operatively connected to the foot shifter assembly, the at least one switch causing automatic actuation of at least one of the gear box and the clutch assembly.

5. A vehicle according to claim 4, wherein the at least one switch causes automatic actuation of only the clutch assembly.

6. A vehicle according to claim 4, wherein the at least one switch causes actuation of only the gear box.

7. A vehicle according to claim 3, wherein the automated actuation mechanism comprises at least two switches, one switch being operatively connected to the clutch assembly and another switch being operatively connected to the gear box, and wherein the at least two switches cause automatic actuation of the gear box and the clutch assembly, respectively.

8. A vehicle according to claim 1, wherein W is less than about 5.3 joules for an up-shift and less than about 5.0 joules for a down-shift.

9. A vehicle according to claim 8, wherein W is less than about 4.3 joules for an up-shift and less than about 4.0 joules for a down-shift.

10. A vehicle according to claim 3, wherein the foot shifter assembly and the automated actuation mechanism form at least a portion of a gear shift assembly.

11. A vehicle, comprising:
    a plurality of wheels;
    an engine operatively coupled to at least one of the plurality of wheels to impart a driving rotation thereto;
    a clutch assembly operatively connected to the engine;
    a gear box configured to shift gears and being operatively connected to the clutch assembly; and
    a foot shifter assembly connected to the clutch assembly and the gear box and displaceable to initiate in parallel both the clutch assembly and the gear box, and
    wherein displacement of the foot shifter through a predetermined distance actuates the clutch assembly and the gear box to shift gears.

12. The vehicle of claim 11, further comprising at least one automated actuating mechanism operatively connected to the foot shifter assembly to automatically actuate at least one of the gear box and the clutch assembly.

13. The vehicle of claim 12, wherein the at least one automated actuating mechanism comprises first and second switches, the first switch being operatively connected to the clutch assembly, the second switch being operatively connected to the gear box, the first and second switches being initiated by displacement of the foot shifter assembly.

14. The vehicle of claim 11, wherein the clutch assembly is at least one of a hydraulic clutch assembly, an electromagnetic clutch assembly and a multi-disc clutch assembly.

15. A vehicle according to claim 11, wherein actuation of the clutch assembly and the gear box is substantially in series.

16. A vehicle according to claim 12, wherein the foot shifter assembly includes a foot lever that pivots a shift lever, the shift lever including an engaging member that interfaces with a portion of the at least one automated actuating mechanism.

17. A vehicle according to claim 16, wherein the engaging member includes at least one of a notch and a trigger.

18. A vehicle according to claim 12, wherein the foot shifter assembly and the automated actuating mechanism form at least a portion of a gear shift assembly.

19. A gear shift assembly for a straddle-type vehicle including a power unit having a transmission assembly having a plurality of gears for transmitting power to at least one wheel, the assembly comprising:
    a foot shifter assembly operatively connected to the transmission assembly and selectively displaceable over a predetermined distance by a vehicle operator;
    a shift rod having a first end attached to the foot shifter assembly and a second end configured for transferring motion when the foot shifter assembly is displaced over the predetermined distance;
    a shift lever linked to the second end of the shift rod and having a notch formed therein;
    a clutch having a plurality of clutch plates configured to engage and disengage the gears; and
    an electrical switch associated with the clutch and configured for opening the clutch plates, the electrical switch having a trigger operatively associated with the notch, wherein movement of the shift lever actuates the electrical switch to open and close the clutch plates.

20. An apparatus according to claim 19, wherein a portion of the trigger is disposed within the notch.

21. An apparatus according to claim 19, wherein the foot shifter includes a first member and a second member engageable with the first member at a plurality of spaced locations.

22. An apparatus according to claim 21, wherein the first member is curved in an upward direction.

23. An apparatus according to claim 21, wherein the first member is curved away from the power unit.

24. An apparatus comprising:
- a straddle-type vehicle including a body frame supported by front and rear wheels;
- a seat supported above the frame;
- a power unit having a transmission including gears, the power unit being supported by the frame below the seat; and
- a foot shifter assembly operatively attached to the power unit and displaceable over a predetermined distance (d) upon application of a predetermined amount of force (F) by a vehicle operator, the selective displacement of the foot shifter assembly thereby shifting the gears;
- wherein the selective movement includes an up-shift and a down-shift;
- wherein the predetermined distance (d) permits the shifting of the gears using a predetermined amount of work (W), the predetermined amount of work being defined by the following expression: $W=(F)*(d)$; and
- wherein at least one of the following conditions exist: 1) W is less than about 5.3 joules for an up-shift and 2) W is less than about 5.0 joules for a down-shift.

25. An apparatus according to claim 24, wherein W is less than about 5.3 joules for an up-shift and less than about 5.0 joules for a down-shift.

26. A vehicle according to claim 25, wherein W is less than about 4.3 joules for an up-shift and less than about 4.0 joules for a down-shift.

* * * * *